United States Patent [19]

Campbell et al.

[11] Patent Number: 5,452,162
[45] Date of Patent: Sep. 19, 1995

[54] ACTIVE ELECTROMAGENTIC LATCH HAVING NO MOVING PARTS FOR DISK FILE ACTUATOR

[75] Inventors: Robert O. Campbell, Louisville, Colo.; Thomas A. Tacklind, San Martin, Calif.

[73] Assignee: Quantum Corporation, Milpitas, Calif.

[21] Appl. No.: 278,700

[22] Filed: Jul. 21, 1994

Related U.S. Application Data

[63] Continuation of Ser. No. 41,564, Apr. 2, 1993, abandoned.

[51] Int. Cl.⁶ .......................... G11B 5/54; H01H 9/00
[52] U.S. Cl. ............................... 360/105; 335/179
[58] Field of Search ............... 360/105, 106; 335/179, 335/229, 230, 233, 234

[56] References Cited

U.S. PATENT DOCUMENTS

| | | | |
|---|---|---|---|
| 3,914,723 | 10/1975 | Goodbar | 335/79 |
| 4,139,874 | 2/1979 | Shiraishi | 360/86 |
| 4,538,193 | 8/1985 | Dimmick et al. | 360/137 |
| 4,594,627 | 6/1986 | Viskochil et al. | 360/105 |
| 4,647,997 | 3/1987 | Westwood | 360/105 |
| 4,654,735 | 3/1987 | Izraelev et al. | 360/104 |
| 4,660,120 | 4/1987 | Manzke et al. | 360/137 |
| 4,686,595 | 8/1987 | Bryer | 360/106 |
| 4,692,829 | 9/1987 | Campbell | 360/105 |
| 4,706,142 | 11/1987 | Hattori et al. | 360/105 |
| 4,716,480 | 12/1987 | Wiens et al. | 360/105 |
| 4,751,595 | 6/1988 | Kistli et al. | 360/105 |
| 4,764,831 | 8/1988 | Patel | 360/105 |
| 4,851,943 | 7/1989 | Perry | 360/105 |
| 4,868,695 | 9/1989 | Quatro et al. | 360/104 |
| 4,881,139 | 11/1989 | Hazebrouck | 360/105 |
| 4,890,176 | 12/1989 | Casey et al. | 360/105 |
| 4,903,157 | 2/1990 | Malek | 360/105 |
| 4,947,274 | 8/1990 | Casey et al. | 360/105 |
| 4,965,684 | 10/1990 | Stefansky | 360/78.12 |
| 5,025,335 | 6/1991 | Stefansky | 360/97.01 |
| 5,208,713 | 5/1993 | Lindsay et al. | 360/105 |
| 5,361,182 | 11/1994 | Sampietro | 360/105 |

FOREIGN PATENT DOCUMENTS

WO88/09552  12/1988  WIPO.
90/05360  5/1990  WIPO ............. G11B 5/54

OTHER PUBLICATIONS

Fink, Donald G. and Beaty, H. Wayne; Standard Handbook for Electrical Engineers; 1987; 4–112 Through 4–115.

Primary Examiner—A. J. Heinz
Assistant Examiner—David D. Davis
Attorney, Agent, or Firm—David B. Harrison

[57] ABSTRACT

A magnetic latch for a disk file actuator comprises a latch plate formed of a magnetic material of low magnetic hardness located on the actuator; a core ferromagnetic material of medium magnetic hardness mounted relative to the base and surrounded by a coil. A power supply is selectively coupled to the coil for applying magnetizing/demagnetizing energy to the core. As the latch plate moves in a direction toward the core and a magnetizing force is applied by the power supply, the latch plate becomes drawn to and restrained by the core. When a demagnetizing force is applied to the coil by the power supply, the actuator is released from the latched position.

15 Claims, 3 Drawing Sheets

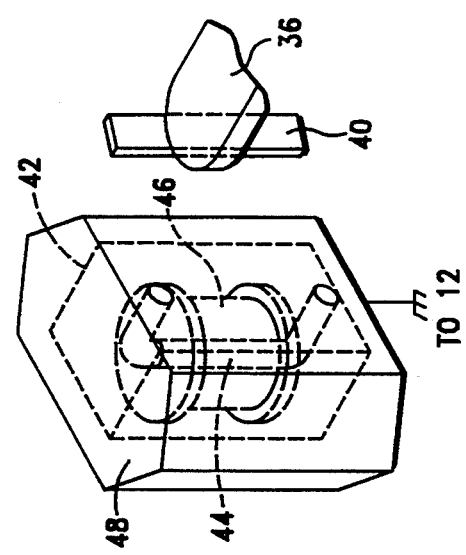
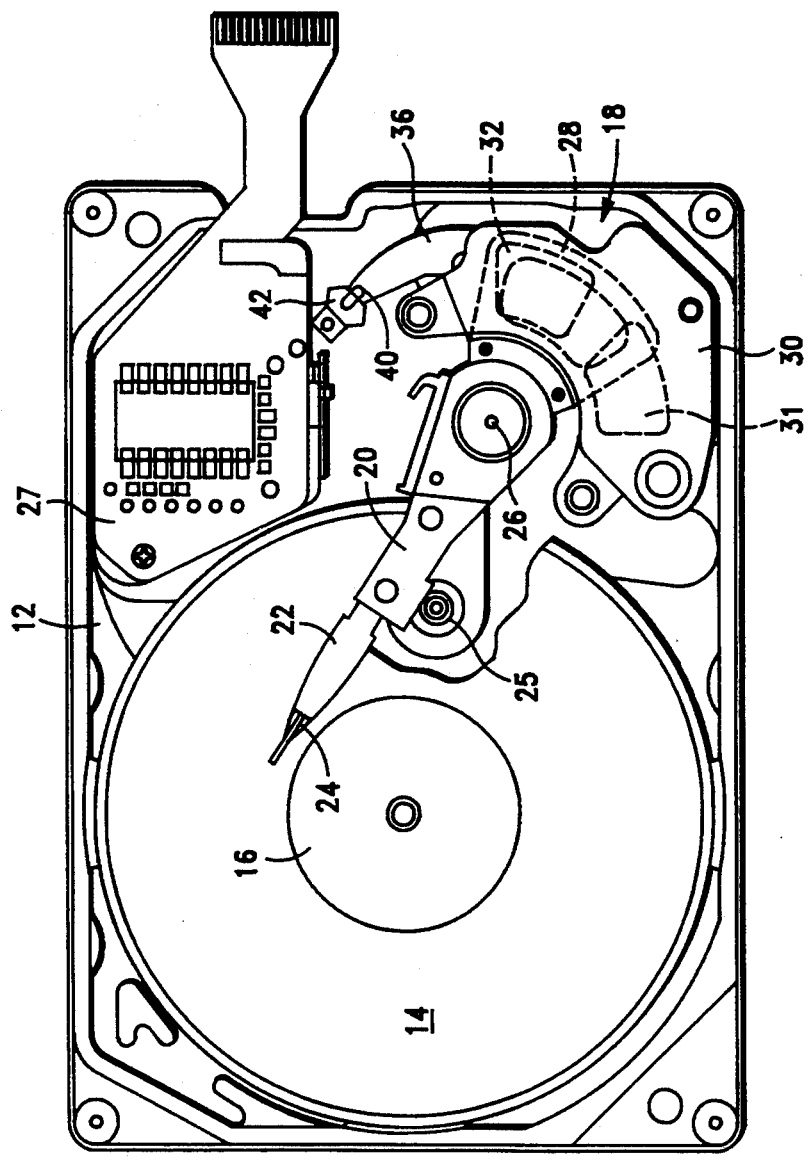
FIG.-2
FIG.-1

ACTIVE ELECTROMAGENTIC LATCH HAVING NO MOVING PARTS FOR DISK FILE ACTUATOR

This is a continuation of application Ser. No. 08/041,564, filed Apr. 2, 1993, now abandoned.

FIELD OF INVENTION

The present invention relates to latching mechanisms within a disk drive. More particularly, the present invention relates to a dual state magnetic latch for latching a disk file actuator so that the data transducer heads are parked and maintained at a predetermined landing zone.

BACKGROUND OF THE INVENTION

In accordance with Winchester fixed disk drive technology, data transducer head sliders "fly" upon an air bearing effect in very close proximity, e.g. 7 micro inches or less, to a disk data storage surface. The air bearing exists only when the storage disk is rotating. When the disk stops rotating, in a "contact-start-stop" disk drive, the head sliders "land" on the disk surface. Storage media is frequently provided with an overcoat or a lubricating coat in order to withstand direct contact between the head slider and the storage surface. Consequently, some disk drive manufacturers permit the slider to land at any location of the data storage disk.

Direct contact between the disk and the heads may abrade or interfere with the storage media. Data recorded at the location of direct contact may be changed, or a permanent defect known as a "hard error" may develop. Accordingly, many disk drive manufacturers provide a dedicated landing zone for the head sliders. This landing zone is usually selected to be the innermost usable radius of the data storage disk, as magnetic storage cells or domains are fewest at the radially inwardmost area of the disk.

Head sliders are typically formed of highly lapped ferroceramic material. The edges of the rails are very sharp. Radial displacement of the head sliders while in contact with the data storage surface has proven very detrimental to the integrity of the storage surface. Such movements may gouge, scratch or scrape away the magnetic data storage coating. Thus, a latch is frequently provided to lock the head positioner assembly (herein "actuator") at the landing zone when power is removed from the disk drive and/or the spindle motor is not spinning (as may occur during a reduced power standby state).

Actuator latches have taken many forms. One approach pioneered by the assignee of the present invention has been to provide an aerodynamically released actuator latch which releases the actuator in response to airflow generated by disk rotation by overcoming a reverse bias force; see, e.g. commonly assigned U.S. Pat. Nos. 4,538,193; 4,692,829 and 4,647,997. One drawback of the approaches described in these patents is that with small disk diameters, such as 3.5" and below, airflow from a single disk may be insufficient to enable the actuator latch to operate reliably within a manufacturable design for mass production of disk drives.

Bistable electromagnetic latches have been proposed in the prior art. Pertinent examples include U.S. Pat. No. 4,881,139 to Hazebrouck; U.S. Pat. No. 4,654,735 to Izraelev et al.; U.S. Pat. No. 4,965,684 to Stefansky; and U.S. Pat. No. 4,903,157 to Malek. Other patents considered in preparation of the application leading to this patent include U.S. Pat. Nos. 4,890,176 and 4,947,274 to Casey et al.; U.S. Pat. No. 4,868,695 to Quatro et al.; U.S. Pat. No. 4,851,943 to Perry; U.S. Pat. No. 4,764,831 to Patel; U.S. Pat. No. 4,751,595 to Kishi et al.; U.S. Pat. No. 4,706,142 to Hattori et al.; U.S. Pat. No. 4,686,595 to Bryer; U.S. Pat. No. 4,660,120 to Manzke et al.; U.S. Pat. No. 4,139,874 to Shiraishi; U.S. Pat. No. 4,594,627 to Viskochil et al.; and U.S. Pat. No. 4,716,480 to Wiens et al.

Commonly assigned, copending U.S. patent application Ser. No. 07/696,629 filed on May 7, 1991 and entitled, "Bistable Magnetic/Electromagnetic Latch for Disk File Actuator," now U.S. Pat. No. 5,208,713, describes an improved bistable latch employing magnetic and electromagnetic elements for latching a disk file actuator so that data transducer heads are parked and maintained at a predetermined landing zone. Although this device works effectively for its intended purpose, it requires a number of components and is relatively expensive to make. In addition, this prior art latch operated satisfactorily only within a narrow range of power supplied from an external power supply.

Another approach which is pertinent to the present invention is described in U.S. Pat. No. 5,025,355 to Stefansky. This patent describes an actuator latch that employs a fixed capture magnetic assembly for capturing a radially extended, magnetically permeable capture body of the rotary voice coil actuator as the landing zone is approached.

One drawback of the fixed capture magnets is their tendency to exert a bias force upon the actuator as it moves into the vicinity of the parking zone, thereby interfering with servo loop control of the head position at radially innermost tracks. In addition, as drive diameters become smaller, to 2.5" or 1.8" one serious drawback of known magnetic capture latches is that the capture magnet unduly influences the actuator during its range of movement over the storage tracks, leading to head positioning instabilities.

Hence, despite the numerous and varied approaches exemplified by the above patents, hitherto unsolved need has remained to continue to develop effective, low cost mechanisms for latching a disk drive actuator to maintain the heads in the landing zone when the disk is not spinning.

SUMMARY OF THE INVENTION WITH OBJECTS

A general object of the present invention is to provide a latch for a disk drive actuator which overcomes the limitations and drawbacks of prior approaches.

A more specific object of the present invention is to provide an electromagnetic latching mechanism that can be magnetized and demagnetized in a manner that enables and facilitates selective latching of the disk file actuator.

Another specific object of the present invention is to provide a magnetic latch for a disk drive actuator which may be configured to have considerably more holding power in a parked position when latching the actuator than is present in a release position.

A further specific object of the present invention is to provide a magnetic latch for a disk drive actuator which may be demagnetized by a reverse field DC current.

Yet another specific object of the present invention is to provide a magnetic latch having a desired hysteresis characteristic for latching and releasing a disk drive rotary voice coil actuator coil, and which minimally influences the actuator throughout its useful range of concentric data storage tracks.

Still one more specific object of the present invention is to provide a magnetic latch for a disk drive actuator wherein the latch comprises a subassembly which may be installed as a finished unit within the head and disk assembly including the drive actuator.

A dual-state magnetic latch is provided for a disk drive. The drive includes a rotary voice coil actuator for positioning a data transducer head relative to a rotatable data storage disk within a disk drive. The drive also includes a base to which the actuator is movably mounted. The dual state magnetic latch comprises two cooperating pads: a first part forming a latch plate of a ferromagnetic material, and a second part forming a magnetic latch assembly. One of the parts is referenced to the actuator and the other part is referenced to the base. One part is a passive latch plate formed of magnetic material of low magnetic hardness. The other part is an active dual-state magnetic latch and includes a core comprising a magnetic material of medium magnetic hardness and a coil of wire surrounding the core. A power supply is selectively coupled to the coil for controllably applying a predetermined electrical energy to the coil during a magnetic latch control sequence to alter the core's magnetic state between magnetized and demagnetized. The core and the latch plate are in proximity such that the latch plate is attracted to and restrained by the core after it has been magnetized and when the actuator has moved to a latch position, and the latch plate ceases to be attracted to and restrained by the core when a demagnetizing force is thereafter provided to the core by the power supply, whereby the actuator is released from the latch position and is thereafter free to move along a locus of limited displacement without any influence or bias force being applied by the core.

In one aspect of the present invention, the latch plate may be carried by a moving portion of the actuator, and the active latch may be referenced to the base, or conversely, the latch plate may be fixed to the base and the active latch may move with the actuator.

In another aspect of the present invention, the core comprises an aluminum nickel-cobalt alloy. In a related aspect, the aluminum-nickel-cobalt alloy comprises Alnico #2.

As a further aspect of the invention, the latch plate is formed of a magnetic material of low magnetic hardness.

As one more aspect of the present invention, the power supply comprises a first circuit for applying a forward-polarity current to the coil to magnetize the core during a magnetizing interval; and a second circuit for applying a reverse-polarity current to the coil to demagnetize the core during a demagnetizing interval. In a related aspect, the first circuit and the second circuit provide direct current pulses formed across a storage capacitor which controllably flow through the coil respectively to magnetize and demagnetize the core.

In one more aspect of the present invention, two pole pieces of soft magnetic material extend from the core to form a horseshoe shaped magnet, the pole pieces conducting flux from the core during its magnetization state to the latch plate.

In yet another aspect of the present invention, the latch assembly is formed as a unitary body and the core and coil are embedded therewithin. Also, the two pole pieces of soft magnetic material which extend from the core to form a horseshoe shaped magnet are embedded within the unitary latch body and extend to a face thereof oppositely facing the latch plate of the actuator at a latch position.

These and other objects, advantages, aspects and features of the present invention will be more fully understood and appreciated upon consideration of the following detailed description of a preferred embodiment presented in conjunction with the accompanying drawings.

BRIEF DESCRIPTION OF THE DRAWINGS

In the drawings:

FIG. 1 is an enlarged plan view of a Winchester fixed drive including a dual state magnetic latch in accordance with the principles of the present invention.

FIG. 2 is an enlarged, highly diagrammatic, isometric view of the magnetic latch shown in FIG. 1.

DETAILED DESCRIPTION OF PREFERRED EMBODIMENTS

Figure 3:
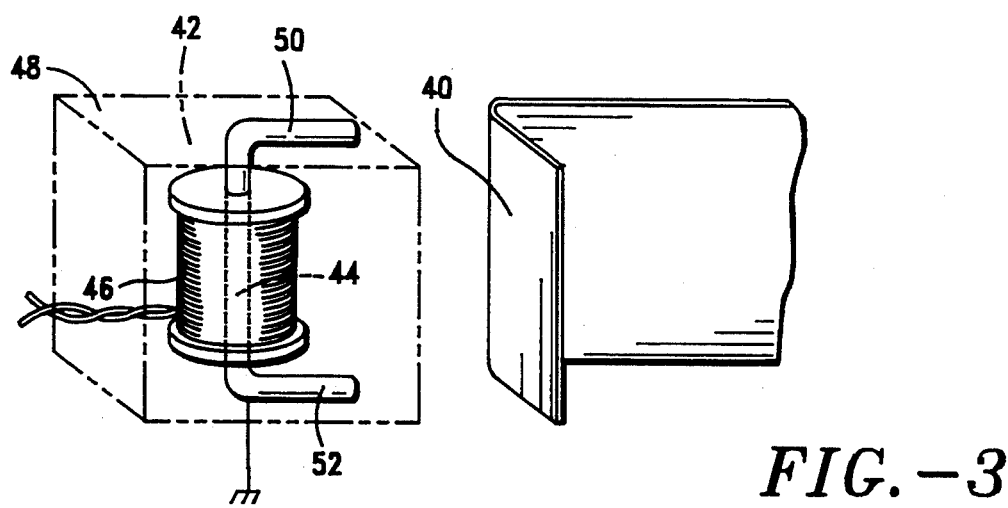
FIG. 3 is another view of the FIG. 2 embodiment.

In order to appreciate and understand the present invention, a presently preferred embodiment thereof is illustrated in FIG. 1 in combination with a head and disk assembly ("HDA") 10 of a fixed disk drive data storage subsystem. The HDA 10 includes a base 12 to which all other elements of the HDA 10 are mounted and/or referenced structurally. At least one data storage disk 14 is mounted within an enclosed interior space of the HDA 10, e.g. as defined by continuous sidewalls of the base 12 and a removable cover (not shown in FIG. 1). The storage disk 14 is mounted to the base 12 via a spindle 16 containing, e.g. an in-hub DC brushless spindle motor. The spindle motor rotates the disk 14 at a predetermined angular velocity, such as 3600 RPM (or faster, depending upon desired average rotational latency to a user data block within a track).

While the storage disk 14 may have any suitable diameter, it most preferably comprises a micro Winchester form factor, such as approximately 3.5 inches, 2.5 inches, 1.8 inches, or smaller. Thus, evidently FIG. 1 is somewhat enlarged over an actual HDA embodying the principles thereof.

An exemplary mass balanced rotary voice coil actuator assembly 18 includes a head arm 20 to which is mounted at least one load beam 22. The load beam 22 supports a data storage transducer head slider 24 at an outer peripheral region thereof. The slider 24 includes a data transducer head, most preferably formed as a thin film head, for example. The load beam 22 is designed to act as a spring as well as a support, and it applies a predetermined loading force on the head slider 24 to urge it toward the data storage surface of the disk 14.

This force is overcome by the air bearing generated by rotation of the disk 14 during operations of the data storage subsystem of which the HDA 10 is an integral part. When the actuator assembly 8 is in the latched position, i.e., it is engaging the permeable portion of the latch housing 40, the head arm 20 abuts the ID crash stop pin 64.

The rotary actuator assembly 18 is mounted to a shaft 26 fixed to the base 12 by suitable bearings (not shown), so that the actuator 18 is generally free to rotate along a locus of limited rotational displacement, thereby moving the head 24 from an outer region of the disk 14 to an inner region thereof, including a landing zone LZ at which the actuator arm 20 rests against an inner crash stop 25. Electronics circuitry, such as a read preamplifier/write driver and switch circuit, and other related circuit elements are mounted to e.g. a flexible plastic film circuit substrate 27. An extension of the substrate 27 exits the interior space of the HDA between an upper lip of the base sidewall and a gasket sealing the cover to the upper lip of the continuous sidewall to enable electrical signal and power connections to be made with an external circuit board (not shown) mounted to the base 12.

Also included within the rotary actuator assembly 18 is a flat, generally wedge shaped actuator voice coil 28 (shown in outline form). The actuator voice coil 28, comprising a coil of insulated small gauge copper wire, is preferably formed integrally with the head arm 20 by conventional plastic encapsulation/molding techniques. The flat voice coil 28 is positioned within a magnetic gap formed between an upper flux return plate 30 formed of the same material and a lower magnetic flux return plate (not shown in FIG. 1).

Two or four high flux intensity permanent magnets are secured to the upper and lower flux return plates and provide intense magnetic fields within the magnetic gap through which the actuator coil moves. The upper ferromagnetic flux return plate 30 is shown in FIG. 1. In a preferred embodiment, two magnets 31 and 32 are secured to the lower flux return plate and have pole faces of opposite polarity directly facing the lower plate and have pole faces of opposite polarity directly facing opposite legs of the coil 28, thereby forming the high intensity magnetic gap. Current passing through the coil 28 in one direction causes rotation of the actuator assembly 18 in one radial direction relative to the disk 14, while reverse current causes reverse direction movement. The magnets 31 and 32 may comprise ceramics of a magnetized rare earth element such as neodymium, for example.

A latch arm extension 36 is preferably formed as an integral part of the actuator coil 28 and in the present example extends from one side thereof. Attached to the extension arm 36 is a small latch plate 40 of suitable magnetic material of low magnetic hardness (sometimes referred to as "soft ferromagnetic material"). The extension arm 38 with its latch plate 40 extends toward a magnetic latching assembly 42 which, in the present example is fixedly mounted to the base 12.

Referring now to FIGS. 2 and 3, one presently preferred embodiment of a latching assembly 42 incorporating principles of the present invention comprises a core 44 of medium hard ferromagnetic material which is surrounded by an electromagnetic coil 46. Pole pieces 50 and 52 of soft magnetic material extend from the core 44 are provided in the embodiment shown in FIGS. 1, 2 and 3, and they conduct the magnetic flux outwardly to the latch plate. Thus, in the embodiments of FIGS. 1–3 the latch plate 40 completes a N-S magnetic flux circuit provided when the core 44 is magnetized. This assembly may then be encapsulated within a suitable plastic material 48 by conventional plastic encapsulation techniques.

The assembly 42 is attached to the base of the drive 10 by any suitable fastening technique, such as by a suitable adhesive or by mechanical fasteners, such as screws (not shown). When the core 44 becomes magnetized, its magnetic field is channeled by the pole pieces 50 and 52 outwardly such that the field will attract and retain the latch plate 40 of the actuator assembly 18. The embodiment of FIGS. 1–3 provides a high efficiency closed-loop magnetic circuit arrangement.

Figure 4:
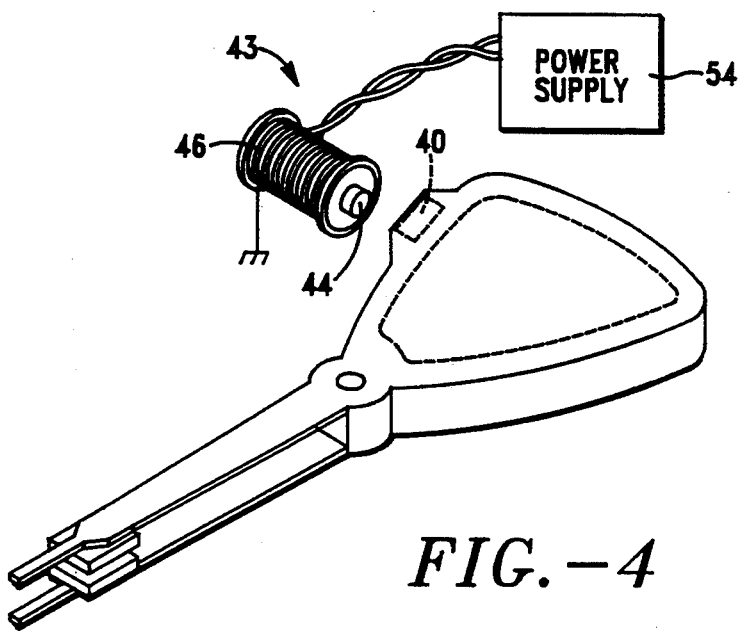
FIG. 4 is a highly diagrammatic, isometric view of another preferred embodiment of the present invention.
Figure 7:
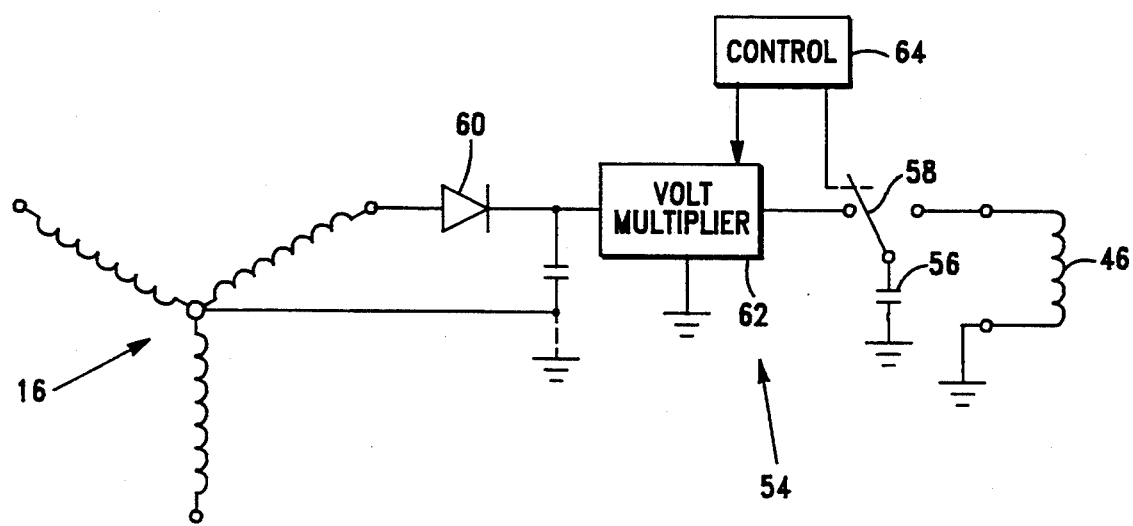
FIG. 7 is an electrical schematic and block diagram of a power supply for providing a magnetizing/demagnetizing potential to the medium hardness ferromagnetic core of the latch embodiments shown in FIGS. 1–4.

Other arrangements are within the purview of the present invention. For example, FIG. 4 shows a latch assembly 43 which is arranged as a single-pole solenoid. In this embodiment, the latch plate 40 is attracted to an exposed pole of the core 44. This arrangement avoids the requirement for pole pieces. While effective for the intended purpose, the FIG. 4 arrangement is somewhat less efficient than the closed-loop circuit of FIGS. 2 and 3. In the FIG. 4 example, one embodiment includes a core 44 of Alnico #2 medium hard magnetic material having a diameter of about 3 millimeters, and a length of about 8 millimeters. A coil 46 of about 500 turns of very fine drawn and insulated copper wire (e.g. 40 gauge) was formed around the core 44. A power supply 54 supplied a DC current pulse of about 20 volts to magnetize the core piece. The energy is stored in a large value storage capacitor 56 which is then selectively permitted to discharge across the coil 46, resulting in residual magnetism in the core 44. As shown in FIG. 7, a switch function 58 enables the capacitor 56 to become charged, and then provides a path for discharge via the coil 46 of the solenoid latch assembly 43.

Figure 5:
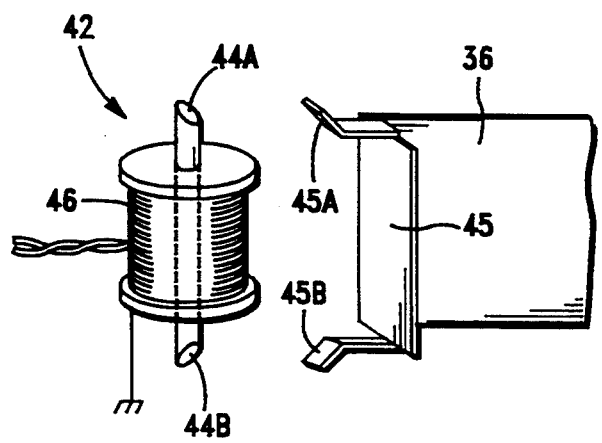
FIG. 5 is a highly diagrammatic, isometric view of yet another embodiment of the present invention.

FIG. 5 illustrates an arrangement in which the magnetic latch plate 43 includes pole pieces for cooperating with the solenoid style latch assembly 43 of the type shown in FIG. 4. In FIG. 5, the core 44 is shaped to provide pole stops 44A and 44B which coact with end tabs 45A and 45B of the generally U-shaped latch plate 45 which is affixed to the actuator arm 36. In this regard, it is important to observe that the geometry of the magnet core is relevant in rendering the core readily demagnetized. In general, a ratio of core length to core diameter which approaches unity results in a core which is most easily demagnetized.

Other arrangements between the latch plate and the latch assembly are readily contemplated and are within the scope of the present invention. For example, the latch plate 43 may be fixed to, or extend as a part of, the base 12, and the core 44 and coil 46 may be formed as a part of the actuator structure which moves relative to the base.

The medium hard ferromagnetic core 44 becomes magnetized when a suitable magnetizing current is passed through the coil 46, and the core 44 retains "permanent" magnetism until a demagnetizing current is passed through the coil 46. When the core 44 is in the magnetized state, and when the latch plate 40 of the actuator arm extension 36 comes into proximity with the assembly 42, the plate 40 is attracted to the pole pieces 50 and 52 such that the arm extension 36 abuts the latching assembly 42 and latches the actuator. When it is desired to release the actuator, a demagnetizing current is passed through the coil 46 such that the core 44 becomes effectively demagnetized, thereby releasing the latch plate 40 and the actuator. The demagnetizing current may be a direct current, or it may be limited cycles of a time-decaying alternating current.

Figure 6:
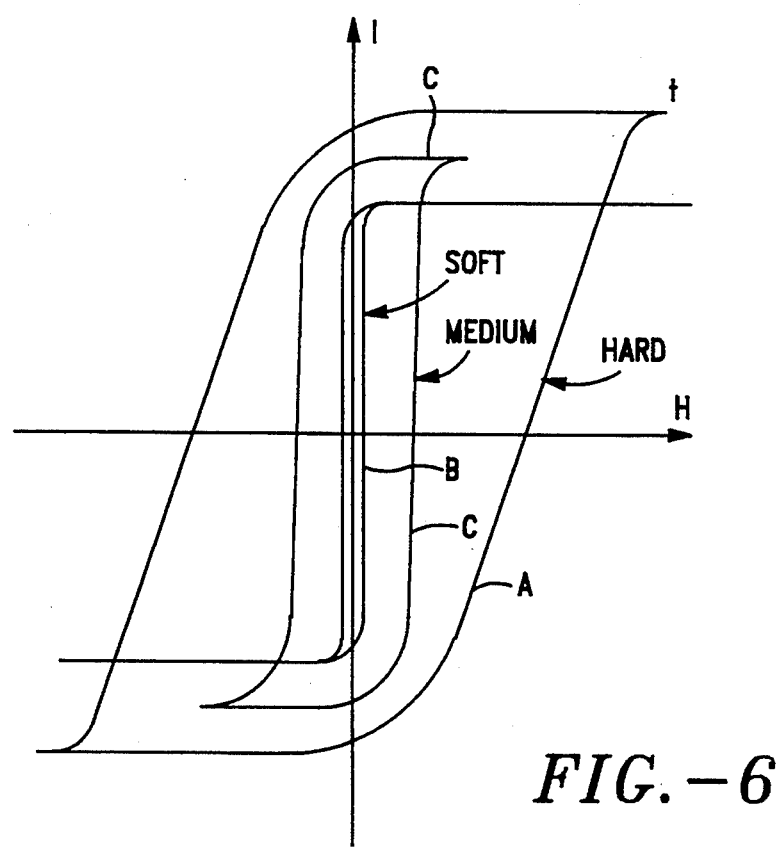
FIG. 6 is an overlay of graphs representing a family of magnetization hysteresis characteristics: graph A being for hard magnetic materials, graph B for soft magnetic materials and graph C for medium hard ferromagnetic materials.

An important consideration in practice of the present invention is the use of an appropriate ferromagnetic material as the core 44. Referring now to FIG. 6, three nested magnetization hysteresis loops are illustrated, for low hardness (i.e. "soft"), hard and "medium hardness" magnetic materials. On one hand, if the core ferromagnetic material 44 is "hard", as indicated by graph A, the hard material will be difficult to demagnetize after it once becomes magnetized. Hard magnetic materials are therefore not reasonably practical for the latching assembly 42 actuator. On the other hand, if the ferromagnetic material is too "soft" as indicated by graph B, the low hardness material will be difficult to magnetize, and will not maintain the actuator in a latched state when current is withdrawn from the coil 46.

The present invention therefore utilizes a core 44 formed of a suitable "medium hardness" magnetic material as indicated by graph C of FIG. 5. The core 44 has a magnetization hysteresis characteristic that lies in between the hard characteristic (graph A) and the soft characteristic (graph C). By using a medium hard ferromagnetic material for the core 44, the core 44 will become permanently magnetized when a magnetization current of reasonable magnitude is applied, and will become demagnetized when a demagnetization current of reasonable magnitude is thereafter applied.

For example, one ferromagnetic material of medium magnetic hardness which is preferred for the core 44 is an aluminum-nickel-cobalt alloy of iron known as Alnico #2. One of ordinary skill in the art will recognize, however, that there are a wide variety of known medium hardness magnetic materials which are suitable for use as the core 44. Use of such other materials is therefore clearly intended to be within the spirit and scope of the present invention.

In order to limit the magnitudes of magnetizing and demagnetizing currents, it is important to limit the mass size of the core 44 to the smallest mass practical to realize an effective latch assembly 42. In very small disk drives, the power that can be obtained to drive the coil 46 is very limited. Hence, it is important to be able to apply enough power to magnetize/demagnetize the core ferromagnetic material within the constraints of the available disk drive power source, which may likely comprise a battery or other limited-current source.

In a preferred embodiment, a portion of the AC signal from the spindle motor 16 (FIG. 7) is used to provide the magnetizing/demagnetizing energy for the coil 46. During automatic retraction of the actuator structure 18 to park the heads 24 at the landing zone (latch position), a rectification circuit 60 is provided so that AC energy generated by the disk drive spindle motor 16 is converted into a direct current. A voltage multiplier circuit 62 multiplies the direct current to a suitably high potential. A control circuit 64 controls polarity reversal of the multiplied voltage within the multiplier circuit 62, and also controls the switch function 58. The multiplied direct current is first stored in the capacitor 56 when the switch is shown in the position illustrated in FIG. 7. When it is time to magnetize or demagnetize the core 44, the switch 58 disconnects the capacitor 56 from the voltage multiplier 62 and connects the capacitor 56 to the coil 46. A resultant direct current pulse of proper polarity is thereupon applied to the electromagnet coil 46 to remagnetize the core 44. By the time the actuator arm 36 comes into proximity with the latch assembly 42, the core 44 is sufficiently remagnetized to effectuate latching of the arm at the landing zone position of its range of travel. When the latch is to be released, a reverse polarity charge is stored across the capacitor 46, and the capacitor discharges across the coil 46, thereby reducing the permanent magnetism to a negligible level. The demagnetizing charge stored across the capacitor 56 is controlled by the control circuit 64 such that the capacitor's discharge is effective to demagnetize the core 44, but not to remagnetize it in a reverse magnetic polarity.

The magnetizing current will be a direct current of suitable magnitude and potential to render the medium hardness core 44 permanently magnetized. While an alternating current may be used to demagnetize the core 44, generation of an alternating current at a suitable power level within a very small hard disk drive is difficult. Accordingly, a DC demagnetizing pulse of reverse polarity from the magnetizing pulse is presently preferred. The magnitude of the DC demagnetizing pulse is selected to be sufficient to return the core 44 to a demagnetized state, without inducing a reverse magnetic polarity permanently into the core 44. Thus, the DC demagnetizing pulse will be of sufficient energy to cause the magnetic state of the core 44 to come down the hysteresis curve (graph B of FIG. 5) sufficiently far enough so that when the reverse polarity energy is removed, the core structure 44 manifests essentially zero residual magnetism.

Through the cooperation of the latch plate 40 on the actuator extension arm 36 with the dual-magnetic-state core 44, a dual state magnetic latch for a hard disk drive actuator is realized which is simple and very inexpensive to implement within the head and disk assembly of the disk drive. It also results in a disk drive latching mechanism that requires very little space compared to those known in the prior art and it has no separately moving mechanical as was required by prior latch designs.

Accordingly, as is seen a dual state magnetic latch assembly is provided that has utility over previously known actuator latching assemblies utilized with disk drives. There are many advantages to such a latch assembly because of its simplicity, low cost, intermittent and low power requirements, and ease of implementation. In particular, the latch assembly of the present invention has significant advantages over previously known latching mechanisms for a submicroWinchester disk drive because the latch requires significantly less area than heretofore.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention.

What is claimed is:

1. A monostable position, dual-state magnetic latch for a disk file actuator for positioning a data transducer head relative to a rotatable data storage disk within a disk drive rotating relative to a base thereof and wherein the actuator is mounted to move relative to the base; the monostable position, dual-state magnetic latch comprising two cooperative parts: a first part forming a latch plate of a ferromagnetic material, and a second part forming a magnetic latch assembly, one of the first and second parts being carried by the actuator and another of the first and second parts being secured to the base; the second part including a core comprising ferromagnetic material of medium magnetic hardness such that it may be controllably transitioned between a magnetized state manifesting permanent magnetism and a demagnetized state, and a coil of wire surrounding the core; a power supply coupled to the coil for controllably applying a predetermined electrical energy to the coil during a magnetic latch control sequence to alter the magnetic state of the core between a magnetized state manifesting permanent magnetism and a demagnetized state; the core and the latch plate being in proximity such that the latch plate is attracted to and restrained by the core when in a said magnetized state manifesting permanent magnetism and when the actuator has moved to a latched position, and the latch plate ceases to be attracted to and restrained by the core when a demagnetizing force is thereafter provided to the core by the power supply and transitions the core to a said demagnetized state, whereby the actuator is thereupon released by the monostable position, dual-state magnetic latch.

2. The magnetic latch of claim 1 wherein the first part is carried by a moving portion of the actuator, and wherein the second part is secured to the base.

3. The magnetic latch of claim 1 wherein the first part is secured to the base and the second part is carried by a moving portion of the actuator.

4. The magnetic latch of claim 1 wherein the core comprises an aluminum nickel-cobalt alloy.

5. The magnetic latch of claim 4 wherein the aluminum-nickel-cobalt alloy comprises Alnico #2.

6. The magnetic latch of claim 1 wherein the latch plate is formed of a soft ferromagnetic material.

7. The magnetic latch of claim 1 wherein the power supply comprises:
   first circuit means for applying a forward-polarity current to the coil to magnetize the core during a magnetizing interval; and
   second circuit means for applying a reverse-polarity current to the coil to demagnetize the core during a demagnetizing interval.

8. The magnetic latch of claim 7 wherein the first circuit means and the second circuit means include storage capacitor means for storing direct current charge and switch means for switching the capacitor means between the first and second circuit means and the coil for providing direct current pulses which flow through the coil respectively to magnetize and demagnetize the core.

9. The latch of claim 1 further comprising two pole pieces of soft magnetic material which extend from the core to form a horseshoe shaped magnet, the pole pieces conducting flux from the core during its magnetization state to the latch plate.

10. The latch of claim 1 wherein the latch assembly is formed as a unitary body and wherein the core and coil are embedded therewithin.

11. The latch of claim 10 further comprising two pole pieces of soft magnetic material which extend from the core to form a horseshoe shaped magnet and wherein the pole pieces are embedded within the unitary latch body and extend to a face thereof oppositely facing the latch plate of the actuator at a latch position.

12. A monostable position dual-state magnetic latch for a rotary voice coil disk file actuator for positioning a data transducer head relative to a rotatable data storage disk within a disk drive rotating relative to a base thereof and wherein the rotary voice coil actuator is mounted to rotate relative to a base thereof and wherein the rotary voice coil actuator is mounted to rotate relative to the base; the monostable position, dual-state magnetic latch comprising two cooperating parts:
   a first part forming a latch plate of a soft ferromagnetic material and being carried by a rotating portion of the rotary voice coil actuator, and
   a second pan forming a magnetic latch assembly secured to the base, the second part including a core comprising a ferromagnetic material of medium magnetic hardness such that it may be controllably transitioned between a magnetized state manifesting permanent magnetism and a demagnetized state, and a coil of wire surrounding the core;
   first circuit means coupled to the coil for applying a forward-polarity current to the coil to magnetize the core during a magnetizing interval,
   second circuit means coupled to the coil for applying a reverse-polarity current to the coil to demagnetize the core during a demagnetizing interval,
   the first circuit means and the second circuit means including storage capacitor means for storing direct current charge, and switch means for switching the capacitor means between the first and second circuit means and the coil for providing direct current pulses through the coil respectively to magnetize and demagnetize the core,
   the core and the latch plate being in proximity such that the latch plate is attracted to and restrained by the core in a physical state manifesting permanent magnetism and when the actuator has moved to a latching position, and
   the latch plate being free to move away from proximity of the core after a demagnetizing force is provided to the core by the second circuit means and transitions the core to a demagnetized state, whereby the actuator is thereupon released by the monostable position, dual-state magnetic latch.

13. The magnetic latch of claim 12 further comprising two pole pieces of soft magnetic material which extend from the core to form a substantially U-shaped magnet, the pole pieces conducting flux from the core while in permanently magnetized state to complete a magnetic circuit with the latch plate at the latching position.

14. The latch of claim 12 wherein the latch assembly is formed as a unitary body and wherein the core and the coil are embedded therewithin.

15. The latch of claim 14 wherein the unitary body further comprises two pole pieces of soft magnetic material which extend from the core to form substantially U-shaped magnet, the pole pieces conducting flux from the core while in permanently magnetized state to complete a magnetic circuit with the latch plate at the latching position.

* * * * *